United States Patent
Nakano et al.

(10) Patent No.: US 7,354,000 B2
(45) Date of Patent: Apr. 8, 2008

(54) METHOD AND SYSTEM FOR SENSING A BARCODE

(75) Inventors: Susumu Nakano, Tokyo (JP); Kentaro Takahashi, Saitama Pref. (JP); Hiroshi Hayakawa, Saitama Pref. (JP)

(73) Assignee: Optoelectronics Co., Ltd., Saitama Pref. (JP)

( * ) Notice: Subject to any disclaimer, the term of this patent is extended or adjusted under 35 U.S.C. 154(b) by 0 days.

(21) Appl. No.: 11/125,399

(22) Filed: May 5, 2005

(65) Prior Publication Data

US 2006/0249583 A1   Nov. 9, 2006

(51) Int. Cl.
  G02B 26/10  (2006.01)
  G06K 7/10   (2006.01)
  G06K 9/00   (2006.01)
  G06K 5/04   (2006.01)
  G06F 7/10   (2006.01)
  H03K 3/00   (2006.01)

(52) U.S. Cl. ............... 235/462.25; 235/462.28; 235/462.12

(58) Field of Classification Search ........... 235/462.24, 235/462.25, 462.01, 454, 461, 462.16, 474, 235/462.41, 462.15, 462.28, 472, 463, 462.13, 235/462.12
See application file for complete search history.

(56) References Cited

U.S. PATENT DOCUMENTS

| | | | | |
|---|---|---|---|---|
| 4,800,256 A | * | 1/1989 | Broockman et al. ... | 235/462.28 |
| 5,272,322 A | * | 12/1993 | Nishida et al. ........ | 235/462.31 |
| 5,278,397 A | * | 1/1994 | Barkan et al. ......... | 235/462.49 |
| 5,371,361 A | | 12/1994 | Arends et al. | |
| 5,430,665 A | * | 7/1995 | Jin et al. .................... | 702/163 |
| 5,444,231 A | * | 8/1995 | Shellhammer et al. . | 235/462.12 |
| 5,457,309 A | * | 10/1995 | Pelton ................... | 235/462.28 |
| 5,767,501 A | * | 6/1998 | Schmidt et al. ........ | 235/462.45 |
| 6,082,621 A | * | 7/2000 | Chan et al. ............ | 235/462.28 |
| 6,343,741 B1 | * | 2/2002 | Arends et al. ......... | 235/462.25 |
| 6,435,412 B2 | * | 8/2002 | Tsi et al. ............... | 235/462.41 |
| 6,616,043 B2 | * | 9/2003 | Zazzu et al. ........... | 235/462.01 |

(Continued)

FOREIGN PATENT DOCUMENTS

JP   60-65383 A   4/1985

(Continued)

OTHER PUBLICATIONS

Int'l Search Report & Written Opin., dated Jan. 24, 2006.

(Continued)

*Primary Examiner*—Thien M. Lee
*Assistant Examiner*—Thien T Mai
(74) *Attorney, Agent, or Firm*—Kaplan Gilman Gibson & Dernier LLP

(57) ABSTRACT

A method and system used in the barcode sensing process are disclosed, in which at least two instances of an optical signal are obtained from the same barcode in different time periods, and digitized by a first digitizer with a first threshold. The digitized results from the at least two instances are then applied with an AND algorithm to eliminate the noise, whereby create a correct digitized output. Preferably, the instances of the signal are also digitized by a second digitizer with a second threshold, which are used to synchronize the timing of the digitized results created by the first digitizer. The second threshold is preferably larger than the first threshold.

19 Claims, 4 Drawing Sheets

U.S. PATENT DOCUMENTS

| | | | |
|---|---|---|---|
| 6,688,524 B1 * | 2/2004 | Bottazzi et al. | 235/462.12 |
| 6,712,271 B2 | 3/2004 | Bianchi | |
| 6,729,543 B1 * | 5/2004 | Arons et al. | 235/462.13 |
| 2002/0117547 A1 * | 8/2002 | Krichever | 235/462.01 |
| 2002/0162890 A1 * | 11/2002 | Tsi et al. | 235/462.16 |
| 2004/0084530 A1 * | 5/2004 | McQueen et al. | 235/462.01 |
| 2005/0103850 A1 * | 5/2005 | Mergenthaler et al. | 235/462.08 |
| 2005/0133600 A1 | 6/2005 | Lucera et al. | |

FOREIGN PATENT DOCUMENTS

| | | |
|---|---|---|
| JP | 64-41079 | 2/1989 |
| JP | 3-25585 A | 2/1991 |
| JP | 04-181384 A2 | 6/1992 |
| JP | 7-177099 A | 7/1995 |
| JP | 11-316794 A | 11/1999 |
| JP | 2000-151290 A | 5/2000 |
| JP | 2000-353940 A | 12/2000 |
| JP | 2001-144552 A | 5/2001 |
| JP | 2001-196877 A | 7/2001 |
| JP | 2002-163601 A | 6/2002 |
| JP | 2003-30577 A | 1/2003 |
| JP | 2003-337941 A | 11/2003 |

OTHER PUBLICATIONS

Int'l Search Report & Written Opin., dated Feb. 7, 2006.
Int'l Search Report & Written Opinion, dated Dec. 27, 2005.
ISR and Written Opinion, dated Aug. 2, 2006.

* cited by examiner

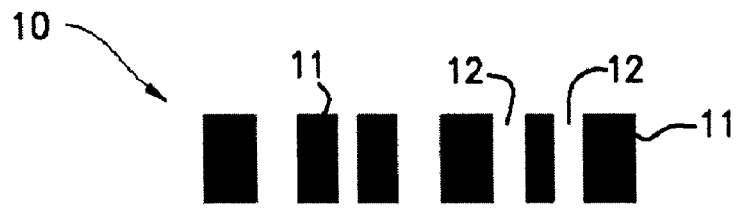
(PRIOR ART) *FIG. 1a*
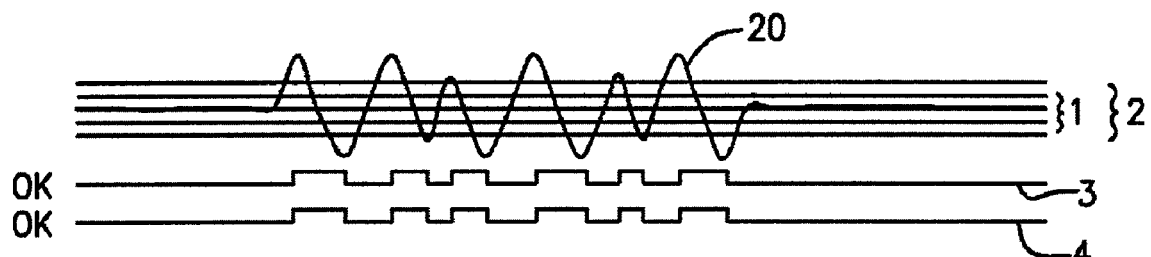
(PRIOR ART) *FIG. 1b*
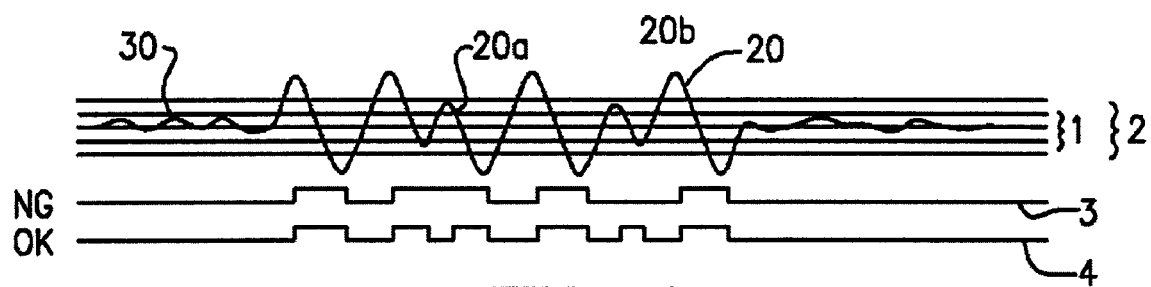
(PRIOR ART) *FIG. 1c*
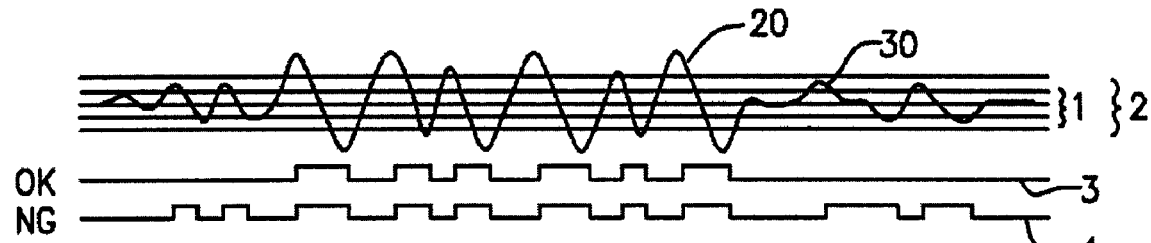
(PRIOR ART) *FIG. 1d*
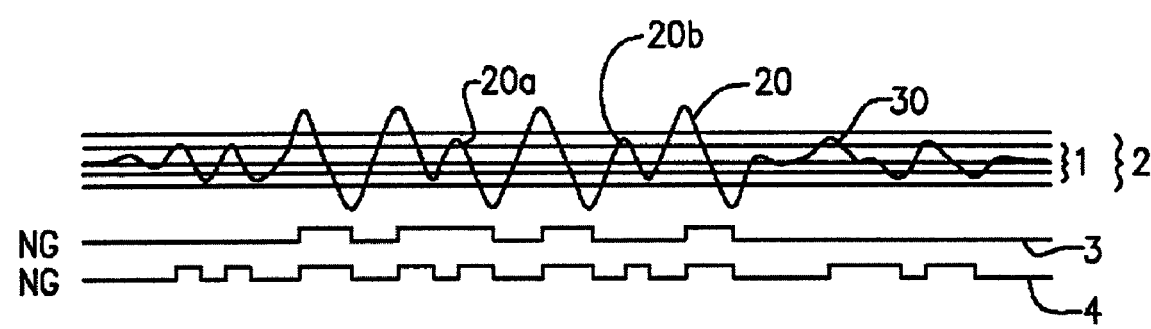
(PRIOR ART) *FIG. 1e*

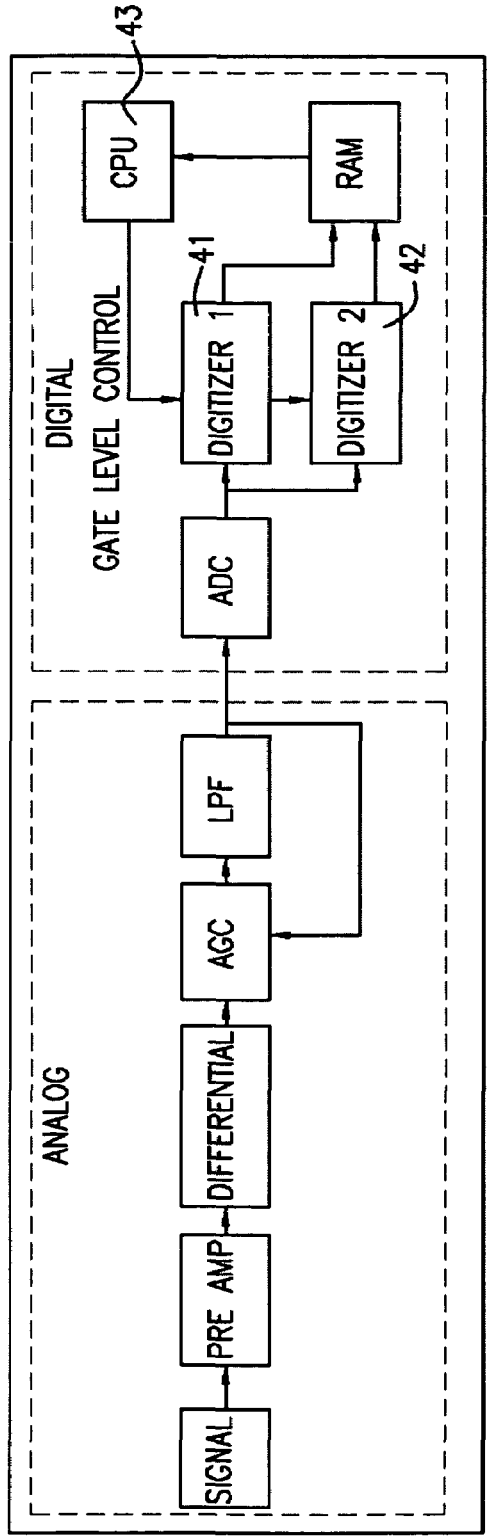
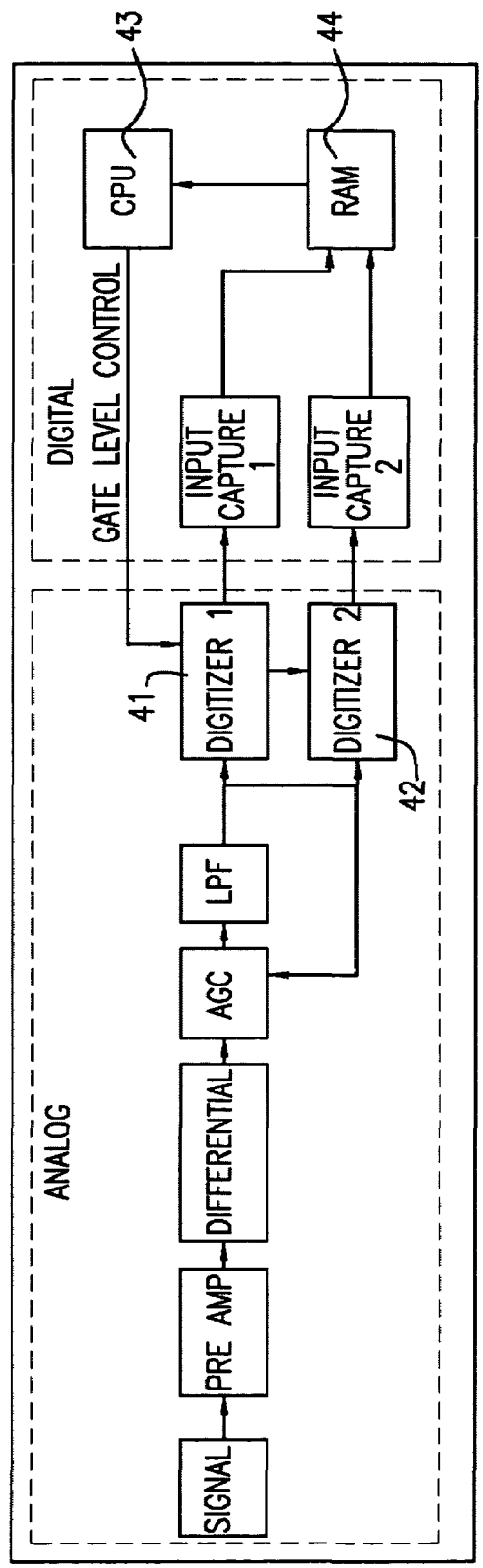
FIG. 3a
FIG. 3b

METHOD AND SYSTEM FOR SENSING A BARCODE

BACKGROUND OF THE INVENTION

The present invention relates to barcode reading techniques, and more particularly, to a method and system for sensing a barcode, especially when the resolution of the signal is low and/or the noise is large.

During a process for sensing a barcode 10 (FIG. 1a), an analog optical signal obtained by a barcode reader or scanner is usually digitized by a digitizer into a digital signal, e.g., into a square wave form. A proper threshold (gate level) of the digitizer is adopted so as to effectively separate the signal from the noise, as shown in FIGS. 1b-1f in which various scenarios are schematically illustrated. In FIGS. 1b-1f, the digitized results 3 and 4 correspond to the higher and lower thresholds 2 and 1 respectively. When the resolution of the signal 20 is high and there is no noise, both higher and lower thresholds 2 and 1 can generate correct result 3, 4 (see FIG. 1b). When the resolution of the signal 20 is low and the noise 30 is small, a lower threshold 1 shall be used so as not to miss some of the signal elements, e.g., 20a and 20b (see FIG. 1c). When the resolution of the signal 20 is high but the noise 30 is also large, a higher threshold 2 shall be used so as not to generate false results from the noise (see FIG. 1d). In any of the above circumstances, the signal can be effectively separated from the noise by selecting a proper threshold.

However, when the resolution 20 is low but the noise 30 is large, the amplitudes of some signal elements 20a, 20b may be close to that of the noise 30, as illustrated in FIG. 1f, thus the signal 20 cannot be effectively separated from the noise by either a higher or a lower threshold 2 or 1. This may happen in the circumstances where the barcode 10 is in a defocus area of the light beam or in a long distance area from the reader, or the barcode is printed with a high density of elements (i.e., bars 11 and spaces 12).

Therefore, there exists a need for a solution that can effectively eliminate the noise from the signal during the digitization process so as to generate a correct digitized output, especially when the noise is of a similar level to the signal of low resolution.

SUMMARY OF THE INVENTION

To achieve the above, a method of sensing a barcode is provided, which comprises the steps of scanning the barcode at least twice at different times so as to obtain at least two instances of an optical signal, digitizing the at least two instances of the optical signal into at least two results, and generating an output using both of the at least two results. Because the noise is usually random in nature and fluctuates more than the real barcode signal, the noise can be eliminated by applying a proper algorithm to the digitized results created from original signals obtained in different time. Preferably, the output is generated by applying an AND algorithm to the at least two digitized results.

Preferably, the method comprises a step of synchronizing the timing in the at least two digitized results. Preferably, each instance of the optical signal obtained in different time is digitized with at least a first threshold and a second threshold. The results from the first threshold are used to generate the output, while the outcomes from the second threshold are used to synchronize the timing of the first results. Preferably, the second threshold is larger than the first threshold, because the noise is usually smaller than the signal.

The present invention also provides a system for sensing a barcode, which comprises detecting means adapted for obtaining at least two instances of an optical signal in at least two scanning operations applied to the barcode at different times, digitizing means for digitizing the at least two instances of the optical signal into at least two results, and means for generating an output by using both of the at least two results. Preferably, the means for generating the output comprises means for applying an AND algorithm to the at least two results so as to eliminate noise that is usually random and fluctuating.

Preferably, means for synchronizing the timing in the at least two results is provided. Preferably, the system comprises a first digitizer with a first threshold to create the above results from the instances of the optical signal, and a second digitizer for digitizing the instances of the optical signal simultaneously with the first digitizer. The outcomes of the second digitizer are used for synchronizing the timing between or among the results from the first digitizer. Thus, the noise in the signal can be effectively eliminated by the dual-digitizer or multiple-digitizer system so as to obtain a correct digitized output.

BRIEF EXPLANATION OF THE DRAWINGS

The above and other features and advantages will be clearer after reading the detailed description of the preferred embodiments of the present invention with reference to the accompanying drawings, in which:

FIGS. 1a-1f schematically illustrate different resolution/noise scenarios in the prior art;

FIGS. 3a and 3b illustrate two embodiments of the system according to the present invention.

DETAILED DESCRIPTION OF THE EMBODIMENTS OF THE PRESENT INVENTION

Figure 2A:
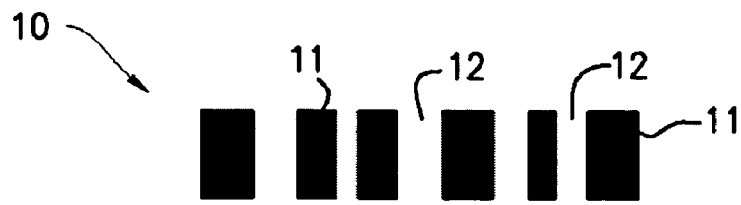
FIGS. 2a-2d schematically illustrate digitized results from three different instances of the original signal obtained from the same barcode.
Figure 2B:
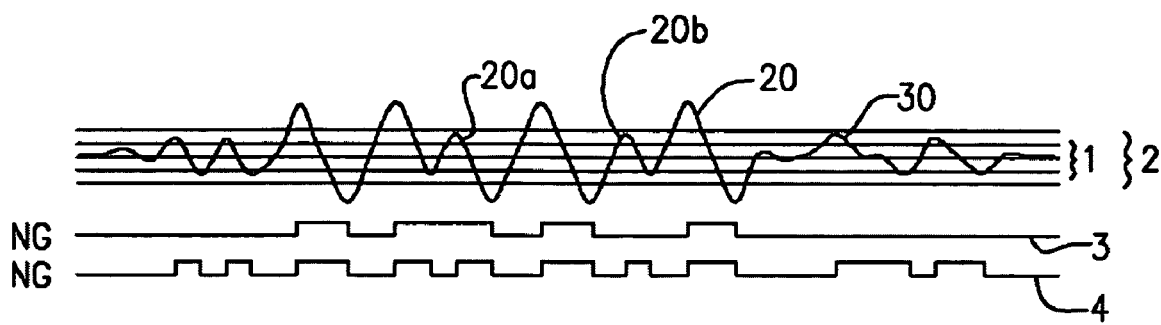
Figure 2C:
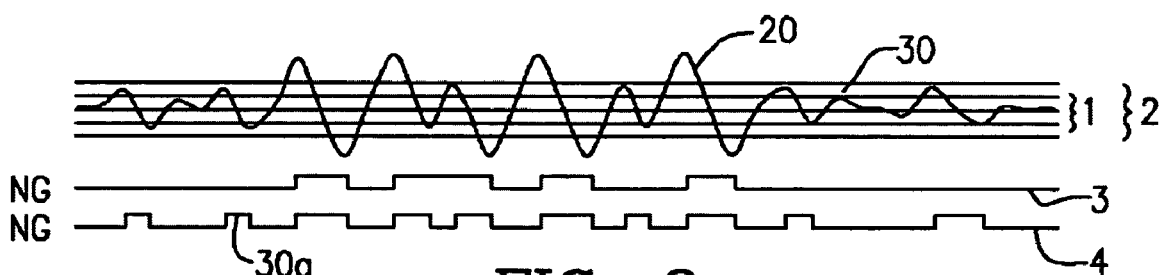
Figure 2D:
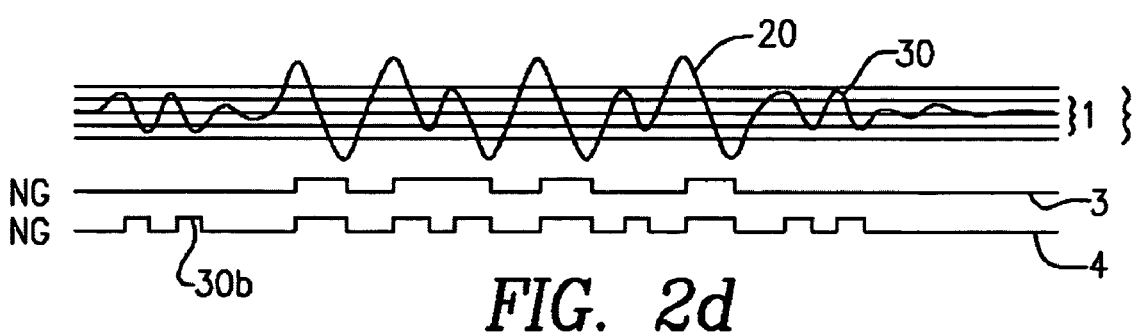
Figure 2E:
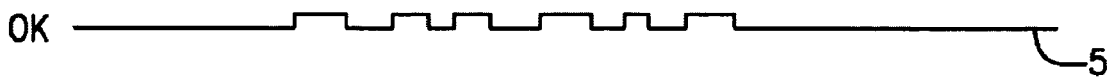
FIG. 2e illustrates an output generated by applying an AND algorithm to the digitized results in FIGS. 2a-2d according to the teaching of the present invention.

FIGS. 2a-2d illustrate the same scenario as in FIG. 2e in which amplitudes of some signal elements 20a, 20b in the signal 20 may be at the same level as that of the noise 30, and no proper threshold can be found to effectively separate the signal 20 and the noise 30 from each other. The lower amplitudes of signal elements 20a, 20b may be caused by the fact that the barcode elements 11, 12 have a higher density in the locations corresponding to the signal elements 20a, 20b (see FIGS. 1a, 1b).

According to the teaching of the present invention, several instances of the optical signal 20 are obtained in different time, e.g., by scanning the same barcode 10 several times with a scanner (not shown). Then all the digitized results from each instances of the optical signal are used to generate a final correct output 5 in which the noise has been eliminated.

FIGS. 2b-2d exemplarily illustrate that three instances of the optical signal have been obtained. It is clearly shown that neither a higher threshold 2 nor a lower threshold 1 can effectively eliminate the noise 30 to generate a correct digitized result. More specifically, none of the digitized results 3, 4 in FIGS. 2b-2d is correct.

According to the teaching of the present invention, all the digitized results 4 created from all the three instances of the optical signal 20 at the first threshold 1 are used to generate a final output 5. In particular, an AND algorithm is applied to all the three digitized results 4 in FIGS. 2b-2d, and a final output 5 is thus generated as illustrated in FIG. 2e. Due to the fact that the noise 30 is usually random in nature and fluctuates more than the signal 20, applying AND algorithm to the digitized results 4, which are created from three instances of the optical signal obtained in different time, effectively eliminates the false wave elements (e.g., elements 30a and 30b) caused by the noise 30 and generates a correct final output of the signal 20.

The first threshold 1 should be properly selected so as to be able to reflect all the elements in the signal 20, including the lower-amplitude signal elements 20a, 20b.

By applying an AND algorithm to the three digitized results 4, the timing of the three digitized results 4 will be synchronized. It is noted that the signal 20 is usually less fluctuating than the noise 30. Therefore, preferably a digitized result 3 at the second threshold 2 is used for determining the timing in the corresponding digitized result 4. Preferably, for each instance of the signal, the digitization at the first and second thresholds is carried out simultaneously.

The second threshold 2 shall be properly selected to reflect the relatively stable signal 20. Since the signal 20 is generally larger than the noise 30, the second threshold 2 is preferably larger than the first threshold 1, thus only reflects the elements of the signal 20. It is noted that lower-amplitude signal elements 20a, 20b are preferably not reflected by the second threshold 2 since they are close to the amplitude of the noise 30.

In a preferred embodiment, a dual-digitizer system is used to carry out the digitization process. More specifically, each instance of the optical signal is input to a first digitizer with the first, lower threshold 1 and a digitizer with the second, higher threshold 2, so as to create the digitized results 4 and 3, respectively. Preferably the two digitizers digitize each instance of the optical signal simultaneously for easier timing determination and synchronization.

FIGS. 3a and 3b illustrate two embodiments of the dual-digitizer system according to the present invention. In the embodiment in FIG. 3a, the dual digitizers 41 and 42 are included in the digital module in the system, while in the embodiment in FIG. 3b, the dual digitizers 41 and 42 are a part of the analog module of the system. It is noted that the thresholds in the digitizers 41 and 42 are controlled by a CPU 43 through a gate level control. The digitized results 3, 4 of each instance of the signal is provided from the digitizers 41, 42 to a memory "RAM" 44 for processing, which includes synchronizing the timing among the digitized results and applying a appropriate algorithm (e.g., an AND algorithm) to the digitized results 4 so as to generate a correct digitized output 5.

Figure 4:
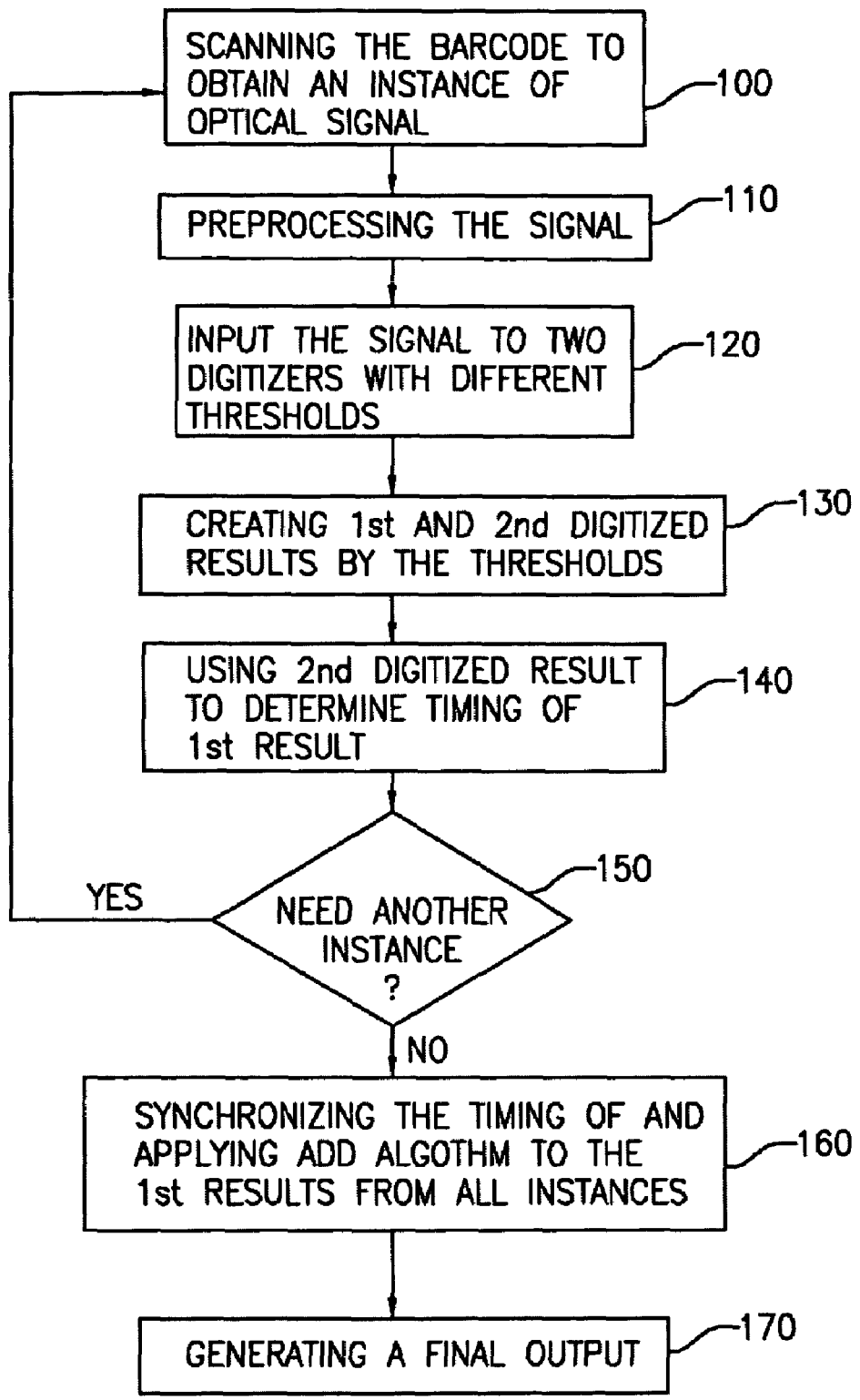
FIG. 4 is a flow chat schematically illustrates the method of the present invention.

FIG. 4 illustrates steps of the method according to the present invention which may be implemented by the system as illustrated in FIGS. 3a and 3b. At block 100, the barcode is scanned once to obtain an instance of the optical signal, which is preprocessed by one or more of the units Pre Amp, Differential, AGC, LPF, ADC as illustrated in FIGS. 3a and 3b, in step 110. The preprocessed signal is then input to both the first digitizer 41 with a first threshold 1 and the second digitizer 42 with a second threshold 2, at step 120. Two different digitized results are created by the two digitizers 41, 42 with different thresholds 1, 2, at step 130. At block 140, the digitized result created by digitizer 42 with the second threshold 2 is used to determine the timing of the digitized result created by digitizer 41 with the first threshold 1. If, at block 150, it is decided that more instances are required, the process goes back to block 100 to obtain a next instance. If it is decided that no more instance of the signal is needed, the digitized results created by the first digitizer 41 with the first threshold 1 from all the instances of signal obtained in block 100 are synchronized in timing and applied with an AND algorithm, in block 160, whereby generating a final, correct digitized output signal at block 170.

Though the above has described the preferred embodiment of the present invention, it shall be understood that numerous adaptations, modifications and variations are possible to those skilled in the art without departing the gist of the present invention. For example, instead of applying the AND algorithm to the digitized results, other appropriate algorithm can be used. For example, a probability algorithm can be applied rather than the AND algorithm if there is enough memory space for storing all the data. Though in the embodiment illustrated in FIGS. 2a-2e uses three instances of the optical signal, two instances or more than three instances may be used instead. Moreover, more than two thresholds may be used so as to increase the accuracy. Besides, other types of digitizing methods may be used instead of using thresholds to generate square waves. Therefore, the scope of the present invention is solely intended to be defined by the accompanying claims.

What is claimed is:

1. A method for sensing a barcode, comprising the steps of:
    scanning said barcode at least twice, at different times, to obtain at least two instances of an optical signal, said instances of said optical signal representing all elements of the barcode;
    digitizing said at least two instances of said optical signal into at least two results using a first digitizing threshold;
    digitizing at least one instance of said optical signal using a second digitizing threshold to obtain timing information; and
    using said timing information to combine the at least two results by performing a logical AND operation on the at least two results to decode the barcode.

2. The method of claim 1, wherein said barcode is scanned at least two times using said second digitizing threshold.

3. The method of claim 1, wherein said step of digitizing using said first threshold is carried out by a first digitizer and said timing information is derived via a second digitizer.

4. The method of claim 1 further comprising:
    synchronizing the at least two results using the timing information.

5. The method of claim 2, wherein, for each of said at least two instances of said optical signal, said step of digitizing at said second threshold and said step of digitizing at said first threshold are carried out at the same time.

6. The method of claim 5, wherein said steps of digitizing at said first and second thresholds are carried out by a first digitizer and a second digitizer respectively.

7. The method of claim 2, wherein said second digitizing threshold is greater than said first digitizing threshold.

8. The method of claim 6, wherein said second threshold is larger than said first threshold.

9. A system for sensing a barcode, comprising:
  detecting means adapted for obtaining at least two instances of an optical signal in at least two scanning operations applied to said barcode at different times, said instances representing all elements of the barcode;
  digitizing means for digitizing said obtained at least two instances of said optical signal into at least two results using a first threshold; and
  means for performing a logical AND operation on said at least two results, wherein the manner in which said logical AND operation is performed depends upon a third digitizing operation of said signal using a second digitizing threshold.

10. The system of claim 9, wherein said digitizing means comprises a first digitizer with said first threshold, and wherein information for performing said logical AND operation includes timing information derived from said third digitizing operation.

11. The system of claim 9 further comprising:
  means for synchronizing said at least two results.

12. The system of claim 9 wherein said second threshold is larger than said first threshold.

13. The system of claim 12, further comprising a gate level control for setting said first and second thresholds.

14. A system, comprising:
  means for scanning a bar code at least twice, at at least two separate times, to obtain at least two respective instances of an optical signal;
  a first digitizer for digitizing said at least two instances of said optical signal into at least two instances of a first result using a first threshold, said instances of said first result representing all elements of the bar code;
  a second digitizer for digitizing said at least two instances of said optical signal into at least two instances of a second result using a second threshold; and
  means for using said instances of said second result to synchronize and perform a logical AND operation on said instances of said first result to decode information from said at least two instances of said first result.

15. The system of claim 14, wherein said second threshold is larger than said first threshold.

16. The system of claim 14 further comprising means for generating an output signal resulting from the step of performing the logical AND operation.

17. A method, comprising
  scanning a bar code at least twice, at at least two separate times, to obtain at least two analog signals, each said signal representing all elements of the bar code;
  digitizing the analog signals into at least two respective digital signals using a first threshold;
  digitizing at least one of the analog signals using a second threshold to generate timing information;
  using the timing information to synchronize the at least two digital signals; and
  performing a logical AND operation on the synchronized at least two digital signals to generate an output signal indicative of the bar code.

18. The method of claim 17 wherein the step of performing the logical AND operation comprises:
  eliminating noise components in the at least two digital signals.

19. The method of claim 17 wherein the second threshold is greater than the first threshold.

* * * * *